United States Patent

[11] 3,631,437

| [72] | Inventors | Duncan Campbell<br>312 Peach Grove Lane;<br>Alexander Donald, 4120 Cresta Avenue,<br>both of Santa Barbara, Calif. 93105 |
|---|---|---|
| [21] | Appl. No. | 844,444 |
| [22] | Filed | July 24, 1969 |
| [45] | Patented | Dec. 28, 1971 |

[54] INTRAVENOUS FEEDING MONITORING SYSTEM
5 Claims, 7 Drawing Figs.

[52] U.S. Cl. .................................................. 340/239 R,
128/DIG. 13, 340/244
[51] Int. Cl. .................................................. G08b 19/00,
A61m 5/16
[50] Field of Search .................................................. 340/239,
244, 282; 346/25; 73/194 E; 222/59; 128/DIG. 13

[56] References Cited
UNITED STATES PATENTS

| 1,831,898 | 11/1931 | Wignall | 340/244 X |
| 3,105,490 | 10/1963 | Schoenfeld | 340/244 X |
| 3,252,623 | 5/1966 | Corbin et al. | 222/59 |
| 3,390,577 | 7/1968 | Phelps et al. | 340/239 UX |
| 3,500,366 | 3/1970 | Chesney et al. | 340/239 X |

FOREIGN PATENTS

| 1,097,816 | 1/1961 | Germany | 235/92–30 |

Primary Examiner—John W. Caldwell
Assistant Examiner—Daniel Myer
Attorney—Pastoriza & Kelly ABSTRACT: A drop rate generator is connected to conductors imbedded in the drop chamber of an intravenous feeding system to generate a series of electrical pulses of frequency corresponding to drop rate. These pulses are fed into an electrical circuit including a logic circuit means for actuating an alarm at a central station when the frequency of the pulses and thus the drop rate is less than a first predetermined frequency or greater than a second predetermined frequency higher than the first predetermined frequency. The first and second predetermined frequencies define a tolerable or acceptable range of frequency variation in the drop rate such that no alarm signals are generated so long as the drop rate is within this range. The system also includes a fluid level indicating means responsive to the lowering of the fluid level in the intravenous feeding bottle below a predetermined level for actuating an alarm at the same remote location.

Patented Dec. 28, 1971
3,631,437
2 Sheets-Sheet 1
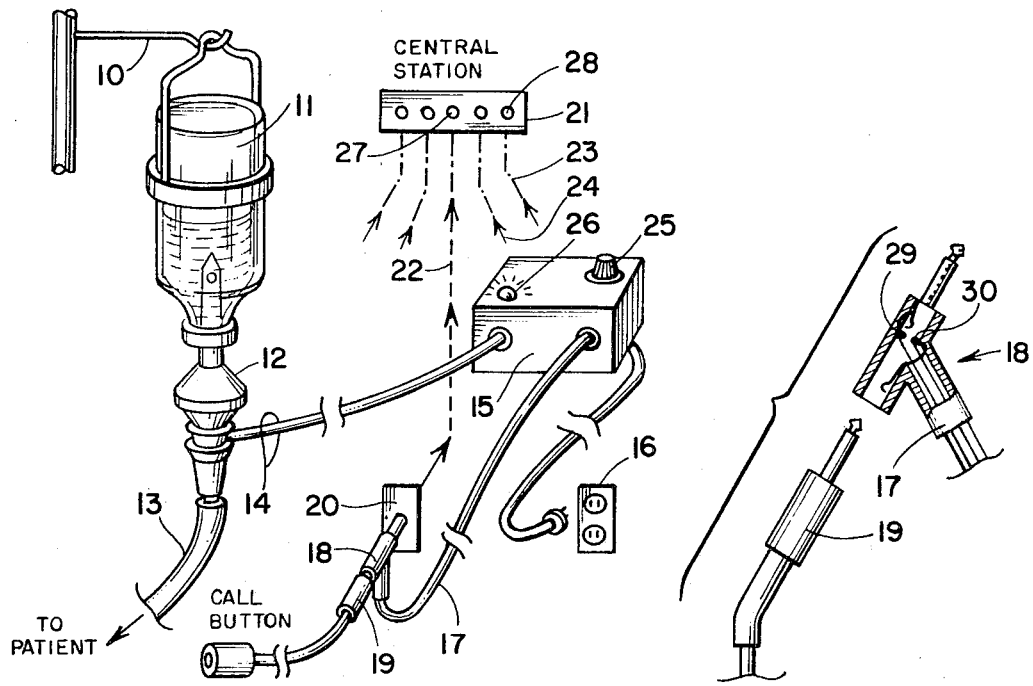
FIG. 1
FIG. 2
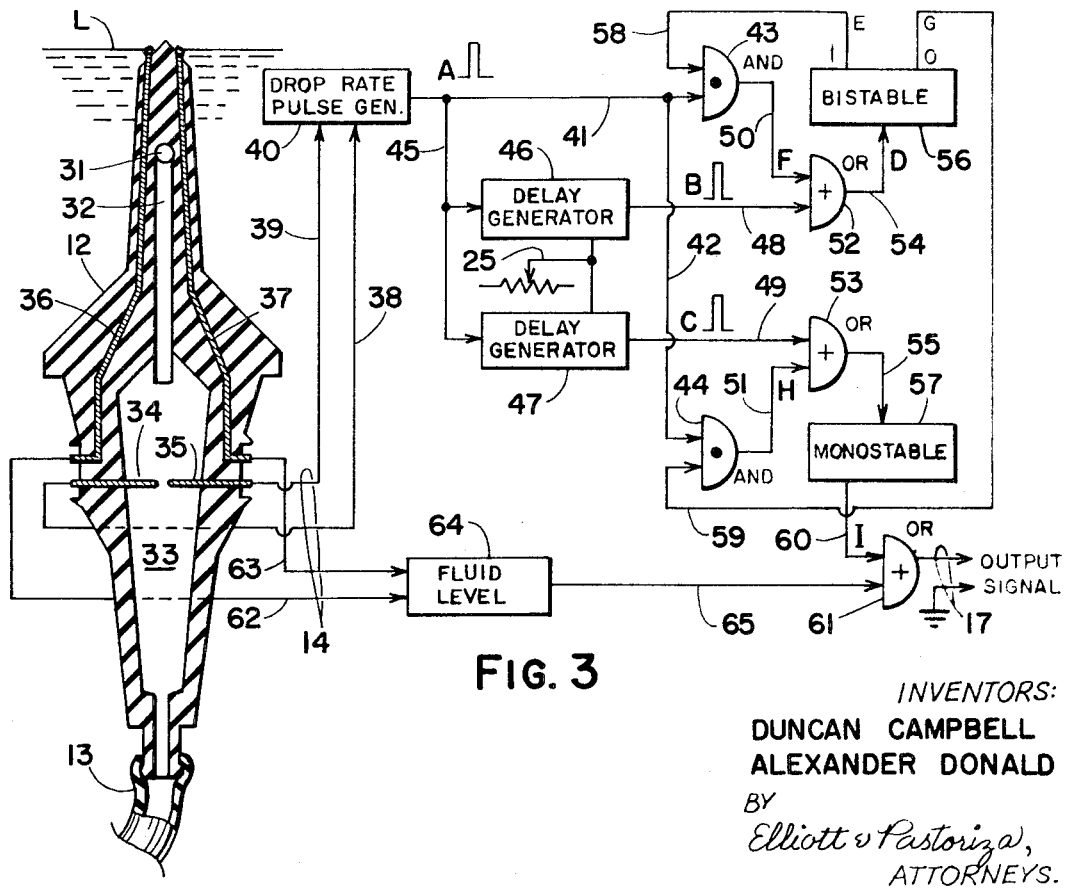
FIG. 3
INVENTORS:
DUNCAN CAMPBELL
ALEXANDER DONALD
BY
Elliott & Pastoriza,
ATTORNEYS.

INVENTORS:
DUNCAN CAMPBELL
ALEXANDER DONALD
BY Elliott & Pastoriza,
ATTORNEYS.

INTRAVENOUS FEEDING MONITORING SYSTEM

This invention relates to a system for continuously monitoring the drop rate and fluid level in an intravenous feeding apparatus while in operation.

It is common practice to administer fluid and medicines in liquid form to a patient by means of an intravenous feeding apparatus. This apparatus consists essentially of an inverted and suspended bottle which contains the liquid, a plastic disposable drop chamber inserted into the bottle, a plastic tubing extending from the lower end of the drop chamber with a drop rate control mechanism attached, and a needle at the end of the tubing for feeding the liquid into the patient's veins.

During an actual feeding operation, it is necessary that the drop rate be prescribed by the doctor and controlled by the nurse. Under these circumstances, and as the intravenous feeding method is practiced generally today, several problems exist.

First, after the intravenous is set up by the nurse, she must set the drop rate by a trial and error method which is not only time consuming, but depends to some extent on the skill of the nurse.

Second, a patient during intravenous feeding often changes his position. If, as a consequence, the needle comes out of the vein into the tissue, it will cause a decrease in the drop rate. On the other hand, if the needle comes out all of the way, the drop rate will increase.

Third, on any specific hospital floor there may be from 10 to 15 intravenous units running at any given time making it difficult for a nurse to keep track of the proper operation of all of the units.

Finally, if the bottle should run dry of feeding liquid before further liquid is added, it is necessary to remove the needle, get another bottle, and then reinsert the needle making sure that no air has been trapped. This operation is time consuming and may be difficult for a nurse especially with elderly or obese patients. This final problem could be avoided if there were some means for warning the nurse prior to complete emptying of the bottle of the fact that the liquid supply was low.

BRIEF DESCRIPTION OF THE PRESENT INVENTION

The present invention contemplates a monitoring system for intravenous feeding wherein all of the foregoing problems are overcome.

More particularly, the system comprises a drop rate generating means responsive to the drop rate of intravenous fluid during feeding for generating a series of pulses of frequency proportional to the drop rate. Means are provided responsive to the series of pulses for actuating an alarm when the frequency is less than a first predetermined frequency or greater than a second predetermined frequency, higher than the first predetermined frequency. By this arrangement, should the drop rate fall outside a tolerable or acceptable range of frequencies, the alarm is actuated and corrective measures can be immediately taken.

The system may also incorporate means responsive to the lowering of the fluid level in the intravenous feeding bottle below a predetermined level for actuating an alarm.

The alarm itself may take the form of a flashing light, audible signal, or both.

In one particular embodiment of the invention, the system comprises a modified disposable plastic drop chamber and an electronic signaling box. The signaling box has a dial calibrated in drops per minute or cubic centimeters per hour and a signal light to indicate when the drop rate in the drop chamber is either higher or lower than the valve set on the dial. A nurse can thus rapidly set the correct drop rate by simply setting the dial on the desired drop rate and adjusting the drop rate control mechanism on the intravenous feeding unit until the signal light goes out. She will thus know immediately without having to count the drop rate that it is correct or within the tolerable frequency range.

If for any reason the drop rate should increase or decrease outside of the tolerable range, the signal light on the signaling box will flash on and off. The signaling box preferably additionally includes an output connected to the nurse call button in each room which flashes a light at the central nurses station. By utilizing the monitoring system on all intravenous units in operation and connecting the same to the central station, it is very easy to keep track of their proper operation and should corrective action be necessary, sufficient warning is given to avoid unnecessary work and discomfort.

As the fluid level decreases in the intravenous bottle and drops below the referred to predetermined level, the signaling box provides a steady signal to the central station. This signal gives the nurse sufficient time to change the bottle before it runs dry.

The signaling box itself incorporates a circuit for actuating the alarm in such a manner that the nurse can immediately distinguish between a drop rate that is too low, a drop rate that is too high, or an empty bottle.

BRIEF DESCRIPTION OF THE DRAWINGS

A better understanding of the invention will be had by now referring to a preferred embodiment thereof as illustrated in the accompanying drawings, in which:

FIG. 1 is a schematic diagram of the intravenous feeding monitoring system of the invention;

FIG. 2 is an enlarged view, partly broken away, of an adapter plug utilized with the system of FIG. 1;

FIG. 3 is an enlarged cross section of a portion of the intravenous feeding apparatus showing connections to the electronic signaling circuit in block diagram form;

DETAILED DESCRIPTION OF THE PREFERRED EMBODIMENT

Figure 4:
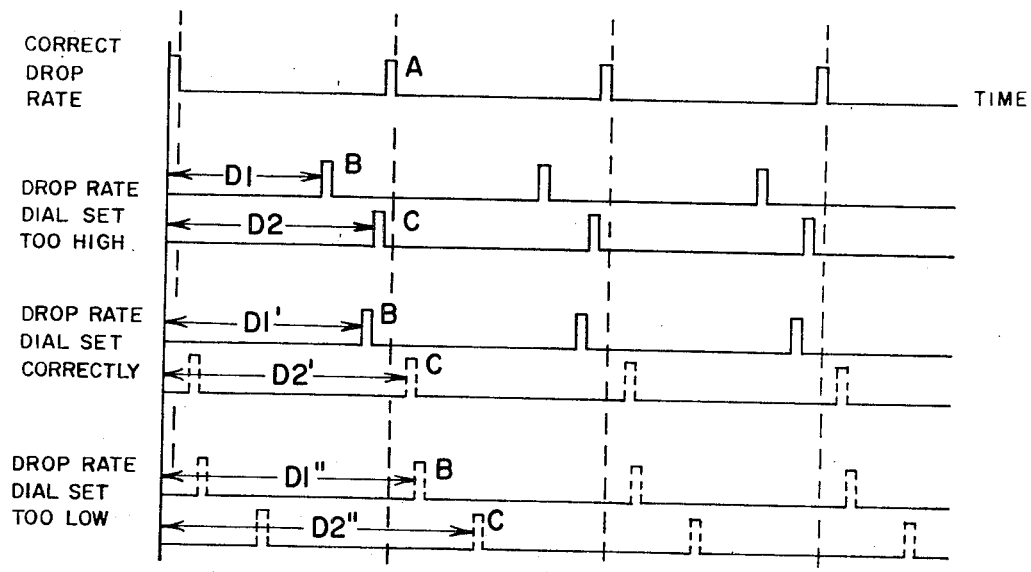
FIG. 4 illustrates a series of timing pulse signals useful in explaining the basic operation of the system.

Referring to FIG. 1 there is schematically illustrated a support 10 for an intravenous feeding bottle 11. The bottle 11 has inserted in its lower end a drop chamber 12 from which extends a plastic tubing 13 for feeding intravenous fluid within the bottle 11 to a patient.

As will become clearer as the description proceeds, the drop chamber 12 of the conventional intravenous feeding apparatus is modified in accord with the present invention to receive a cable 14 carrying four conductors to an electronic signaling box 15. Power for the box may be derived from a conventional 110 volt 60 cycle outlet 16 as schematically indicated.

Output signals from the box 15 may be passed through an outlet line 17 to an adapter plug 18 designed to receive the normal plug 19 of a patient's call button and be inserted in the normal call button line outlet socket 20 in the patient's room. This outlet socket 20 includes leads connecting to a central nurses station 21 as indicated by the dashed line and arrows 22. Similar monitoring systems in other hospital rooms on a floor may also be connected to the central station as indicated by the dashed lines such as 23 and 24.

The box 15 itself includes a drop rate setting dial 25 and a signal light 26. The central station may also include signaling lights such as 27 suitably actuated through the call button line simultaneously with the light 26 on the box 15. Incoming lines from other intravenous monitoring systems also are arranged to energize other lights at the central station such as light 28. Audible alarms may also be provided in conjunction with the flashing lights or as substitutes therefor.

FIG. 2 illustrates in enlarged view the adapter plug 18 of FIG. 1. As noted, this plug includes a lateral casing portion receiving wires in the line 17 from the output of the box 15, there being provided two conductors connected to the normal call button conductors as at 29 and 30 within the adapter. The output lines in the cable 17 are thus simply paralleled with the call button lines in the plug 19 so that signals will be sent to the central station from both the signaling box 15 and the call button.

Referring now to FIG. 3 details of the modified drop chamber 12 and electronic signaling box 15 will be described.

As shown, the drop chamber 12 includes a disposable plastic body having an upper tapered or pointed end incorporating an opening 31 at an intermediate position communicating with an extending tube 32. The lower end of the tube 32 opens at the upper portion of a drop chamber 33. The lower end of this drop chamber communicates, in turn, with the plastic tube 13 for passing intravenous fluid to the patient.

In accord with the present invention, the drop chamber is modified by providing two conductors 34 and 35 extending into the chamber and terminating in spaced relationship in a position to intercept drops of fluid passing from the end of the tube 32 down the chamber. Since the intravenous fluid or liquid is partially conductive, a conductive path is effected between the conductors 34 and 35 each time a drop is intercepted by the conductors.

Two additional conductors 36 and 37 are also imbedded in the plastic body of the drop chamber 12 extending upwardly and terminating a given distance above the upper end of the tube 32 at the point it communicates with the opening 31. With this arrangement, when the level of fluid in the bottle 11 of FIG. 1 decreases below a given level indicated at L in FIG. 3 corresponding to the termination point of the additional conductors, conductivity between these additional conductors is broken.

The cable 14 described in FIG. 1 incorporates four conductors. Two of these conductors are indicated at 38 and 39 and connect to the ends of the two conductors 34 and 35 in the drop chamber 33. The other ends of the conductors 38 and 39 connect to a drop rate pulse generator 40 in the electronic signaling box 15.

The drop rate pulse generator is designed to generate a pulse of electrical energy each time a drop of intravenous liquid from the tube 32 passing down the drop chamber 33 is intercepted by the conductors 34 and 35. Thus, the output from the drop rate pulse generator will constitute a series of electrical pulses at a frequency corresponding to the frequency of the drop rate. The remaining portion of the circuit of FIG. 3 is responsive to the series of pulses from the drop rate pulse generator 40 to actuate the alarm or signal light should the frequency of pulses fall outside an acceptable range.

In the preferred embodiment of the invention, this circuit includes a line 41 and branch line 42 receiving pulses from the drop pulse generator 40 and passing them to first inputs of first and second AND-gates 43 and 44. The same series of pulses is also applied through a branch lead 45 to first and second delay means in the form of delay generators 46 and 47 for providing first and second delay pulses on output leads 48 and 49. The outputs from the first and second AND-gates 43 and 44 connect through leads 50 and 51 to first inputs of first and second OR-gates 52 and 53 respectively. The second inputs to these OR gates connect to the outputs 48 and 49 from the first and second delay generators.

The outputs from the first and second OR-gates 52 and 53 connect through leads 54 and 55 to the inputs of a bistable flip-flop circuit 56 and a monostable flip-flop circuit 57, respectively. A first output side of the flip-flop 56 connects through lead 58 to the second input of the first AND-gate 43 and the second output side of the bistable flip-flop 56 connects through lead 59 to the second input of the second AND-gate 44.

The single output from the monostable flip-flop 57 connects through lead 60 to a first input of a third OR-gate 61.

Referring again to the drop chamber 12, the second two conductors 36 and 37 imbedded therein are connected through lines 62 and 63 to a fluid level control 64. The circuit 64 is designed to provide a continuous output signal on a lead 65 whenever the conductivity between the imbedded conductors 36 and 37 is broken as a consequence of the liquid level falling below the terminal points of these conductors. This continuous signal is applied to the second input of the OR-gate 61. The output from the OR-gate 61 passes through the cable or line 17 from the electronic signaling box 15 described in FIG. 1.

Referring now to FIG. 4, there is depicted in the first time plot a series of pulses A corresponding to the output pulses generated by the drop rate pulse generator 40 of FIG. 3. These pulses A occur at a frequency corresponding to the drop rate of liquid through the chamber 33 of FIG. 3.

In the next two time plots, there are illustrated pulses B and C constituting, respectively, the outputs from the delay generators 46 and 47. These pulses occur at delay times D1 and D2 as measured from each drop pulse A. The delay time interval D2 is greater than the delay time D1 by from 0.01 to 0.5 of the time interval D1. There is thus defined a time window between the pulses B and C.

Referring once again to FIG. 3, the adjustable dial 25 referred to in FIG. 1 takes the form of a potentiometer between the first and second delay generators 46 and 47. Adjustment of this dial changes the delay intervals D1 and D2 simultaneously by the same amounts.

Referring again to FIG. 4 if the dial is set too high for a given drop rate, the pulses B and C will occur as shown after delay intervals D1 and D2 and both will occur before the next successive drop pulse A.

Referring now to the next successive time plot if the drop rate dial 25 is set correctly, the delays times D1 and D2 are changed to D1' and D2' and the pulse B occurs before the next successive drop pulse A. However, since this next successive drop pulse resets the delay generators to start new delay intervals, there will be no time for pulse C to be generated. Therefore, the pulse C under these conditions is not actually generated but would occur at the phantom line position shown in FIG. 4 if the delay generator were not reset by pulse A.

If the drop rate dial is set too low, then both of the pulses B and C would occur after the next successive drop pulse A if this pulse did not reset the delays as indicated in the last time plots of FIG. 4 by the phantom lines. In this instance, the delay times D1 and D2 have been increased to D1" and D2".

The time window established by the pulses B and C defines a tolerable or acceptable frequency range for the drop rate. Thus, if the drop rate or frequency is such that the drop rate pulses A always fall between the pulses B and C, then a correct drop rate has been established.

OPERATION

Figure 5:
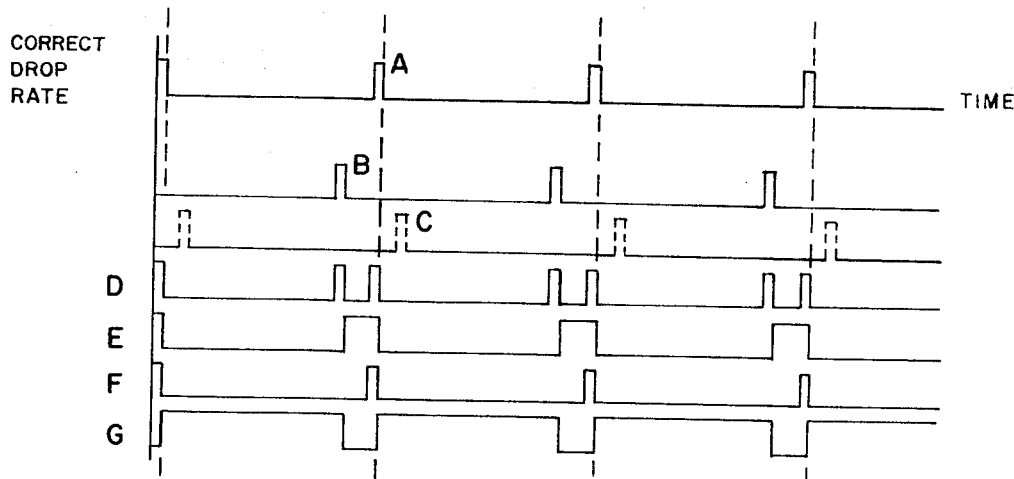
FIG. 5 shows a series of wave forms occuring at correspondingly lettered points in the block diagram circuit of FIG. 3 when a correct drop rate is taking place.
Figure 6:
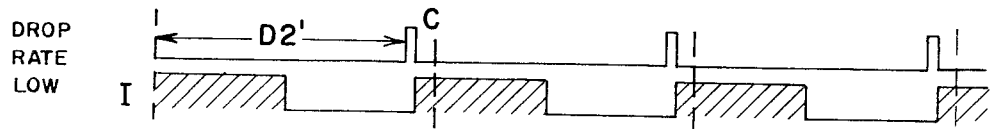
FIG. 6 illustrates by means of waves forms certain conditions that exist in the circuit when the drop rate is too low; and, FIG. 7 illustrates conditions in the circuit when the drop rate is too high.
Figure 7:
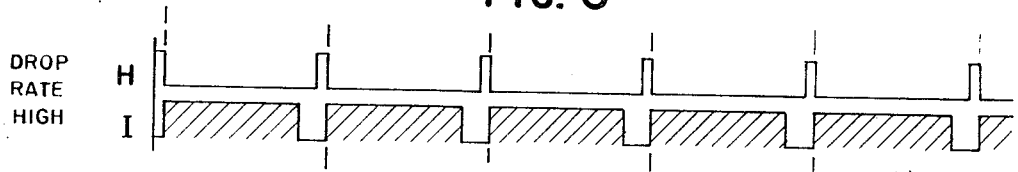

Referring to FIGS. 5, 6 and 7 in conjunction with FIG. 3, the entire operation of the monitoring system will now be described.

Initially, the intravenous bottle 11 of FIG. 1 is set up with the drop chamber 12 inserted in the lower end of the bottle and the cable 14 secured thereto by means of a removable connector passing to the electronic signal box 15 all as shown. The nurse will start the feeding of fluid through the plastic tube 13 by suitably adjusting the drop rate mechanism (not shown) located on the plastic tubing 13. Towards this end, the nurse sets the drop rate dial 25 at the prescribed drop rate. The drop rate mechanism may then be varied to vary the drop rate until such time as the signal which will appear on the light 26 of the box is extinguished. These conditions prevail when the drop rate falls within the time window as described in conjunction with FIG. 4.

With the drop rate correctly established, and with reference now to FIG. 5, it will be noted that the first drop rate pulse received in the first AND-gate 43 will also trigger the delay generators 46 and 47. Because of the proper setting of the drop rate dial potentiometer 25, the output pulse B occurring after the first delay interval will be positioned as shown in FIG. 5 and will occur slightly in time before the next successive drop pulse A.

With specific reference to FIG. 3, this first delay pulse B will pass through the first OR-gate 52 to trigger the bistable flip-flop 56. This triggering pulse is shown as the first pulse of the two grouped pulses shown in waveform D, the trailing edge of the pulse effecting the triggering of the bistable flip-flop. The first output or "logical one" side of the bistable flip-flop passes its signal to the second input of the first AND-gate 43. This output is illustrated by the waveform E and will enable AND-gate 43 to pass the next successive A pulse so that this pulse passes through the AND gate and appears as waveform F at the first input of the first OR-gate 52. The trailing edge of this pulse will switch the bistable flip-flop 56 so that the waveform E is reset and the AND-gate 43 is disabled. The setting and resetting pulses for the "logical one" side of the bistable flip-flop 56 are shown in the waveform D.

The output of the second or "logical zero" side of the bistable flip-flop 56 is shown in waveform G. This waveform disables the second AND-gate 44 so that the drop pulse A passed to the first input on branch lead 42 cannot get through the gate. Also, the second delay pulse C is inhibited by the pulse A which resets the delay generators 46 and 47 each time it is received therein and starts a new delay interval running. This condition is depicted by the phantom line showing of the pulse C.

As a consequence of the foregoing, there is no output from the second OR gate to the monostable flip-flop 57 and therefore there is no output signal on the output lead 60.

Further, so long as the imbedded conductors 36 and 37 in the drop chamber 12 are immersed in the intravenous liquid, there will be no signal generated by the fluid level control 64. Therefore, the output from the third OR-gate 61 is nil and no flashing lights or alarms will be actuated indicating that the intravenous feeding process is proceeding satisfactorily.

Consider now the conditions wherein the drop rate slows down to a frequency which is outside an acceptable range. This lower drop rate frequency is depicted by the dashed vertical lines in FIG. 6 and it will be noted that they occur after the generation of the second delay pulse C. In this instance, accordingly, both B and C delay pulses are generated since the next successive drop pulse is not received until after the delay periods and thus will not reset the delay generators until after the delay periods. The pulse C with reference to FIG. 3 will thus pass through the second OR-gate 53 and trigger the monostable flip-flop 57. The output from this monostable flip-flop is illustrated in waveform I in FIG. 6 and constitutes a signal of given duration determined by the characteristics of the monostable flip-flop. This signal passes through the third OR-gate 61 to the output line 17 and results in a flashing rate for the light on the electronic box 25 in FIG. 1 and simultaneously on the central station indicator light 27 thereby advising the nurse that the drop rate has changed and corrective action is necessary. In this respect, it will be noted that the frequency of the alarm actuating signal I in FIG. 6 corresponds to the decreased drop rate frequency so that the nurse will know that a decrease in the drop rate has occurred.

Referring now to FIG. 7, should the drop rate increase beyond an acceptable frequency as might occur should the needle become accidentally completely dislodged from the patient's vein so that intravenous liquid simply flows freely out of the end of the needle, the drop rate pulses will occur at a higher frequency as indicated by the dashed vertical lines in FIG. 7. Under these conditions, both the delay generators 46 and 47 of FIG. 3 will be reset before either delay pulse B or C is generated. As a consequence, there will be no triggering pulse at the output of the first OR gate for the bistable flip-flop 56 and thus the first AND-gate 43 is not enabled so that the next successive drop rate pulse A cannot get through this gate. Also, as a consequence of nontriggering of the bistable flip-flop 56, the second side output will hold the second AND-gate 44 in an enabled condition so that the successive A pulse on the branch lead 42 will pass through this AND gate and appear as waveform H in FIG. 7. This H pulse will then pass through the second OR-gate 53 and trigger the monostable flip-flop 57 thereby again generating the signal I at a higher frequency corresponding to the increased drop rate.

This higher frequency alarm signal will be observed or heard by the nurse at the central station and indicate to her that the drop rate has increased beyond an acceptable value and she can then take remedial action.

Finally, when the level of intravenous feeding liquid in the bottle drops below the level L depicted in FIG. 3, the conductive path between the conductors 36 and 37 will be removed resulting in a continuous signal from the fluid level control 64. This continuous signal is passed through the third OR-gate 61 to the output line 17. The nurse can readily distinguish this continuous signal from the other intermittent or flashing-type signals and will realize that the intravenous feeding liquid is almost exhausted. However, because this level signal is actuated prior to the liquid level reaching the upper opening 31 communicating with the tube 32, there is time for the nurse to replace the bottle before the same runs dry.

From the foregoing description, it will be evident that the present invention has provided an extremely valuable system for monitoring the intravenous feeding of patients wherein the several problems associated with present day systems are wholly eliminated. The invention may be inexpensively manufactured and requires no modification of existing equipment or rewiring of existing circuits except with regard to the modification of the drop chamber itself.

While only one specific type of logic circuit has been shown and described for distinguishing frequency changes in the drop rate, other equivalent circuits could, of course, be employed without departing from the scope and spirit of the invention.

We claim:

1. An intravenous feeding monitoring system comprising, in combination:
   a. drop rate generating means for connection to the drop chamber of an intravenous feeding apparatus for generating a series of electrical drop pulses at a rate corresponding to the drop rate of fluid in the drop chamber;
   b. first and second delay means connected to receive said drop pulses and generate first and second delay pulses at the end of first and second time intervals as measured from each drop pulse, said second time interval being greater than said first time interval by an amount from 0.01 to 0.50 of said first time interval so that said first and second delay pulses are separated by a given time window;
   c. means for adjusting the duration of said first and second time intervals such that the drop pulse following that from which said time signals are measured falls at a point in time within said given time window when said drop rate is at an acceptable frequency; and
   d. logic circuit means connected to receive said drop pulses and said first and second delay pulses and generate a drop rate alarm in the event the drop pulse following that from which said time intervals are measured falls outside said time window.

2. A system according to claim 1, including a fluid level indicating means connected to said intravenous feeding apparatus for generating a fluid level alarm signal in the event the level of fluid in said intravenous feeding apparatus falls below a given level.

3. A system according to claim 2, in which said drop rate alarm is in the form of a series of short duration signals occurring at a frequency corresponding to the drop rate frequency and said fluid level alarm is in the form of a continuous signal.

4. A system according to claim 1, in which said logic circuit means includes: first and second AND gates having first inputs connected to receive said series of drop pulses; first and second OR gates having first inputs connected to the outputs of said AND gates respectively and second inputs connected to receive said first and second delay pulses respectively; a bistable flip-flop having its input connected to the output of said first OR gate, the first output side of said flip-flop connecting to the second input of said first AND gate, and the second output side of said flip-flop connecting to the second input of said second AND gate; and a monostable flip-flop having its input connected to the output of said second OR gate and its output connected to operate an alarm when its input is triggered by a pulse, whereby a pulse is blocked by said second OR gate from triggering said monostable flip-flop by inhibiting the presence of pulses on its first or second input when the drop rate is of a frequency such that the drop pulse following that from which said time intervals are measured falls within said time window, said second OR gate passing the second delay pulse to trigger said monostable flip-flop when said drop pulse following that from which said time intervals are measured occurs after the second delay pulse and passing a pulse from said second AND gate as a consequence of the enabling of said second AND gate by said bistable flip-flop when said drop pulse following that from which said time intervals are measured occurs before said first delay pulse.

5. A system according to claim 2, in which said drop rate alarm and fluid level alarm are located at a central station and are connected through already present call button lines to said logic circuit means.

* * * * *